(12) United States Patent
Jagtap et al.

(10) Patent No.: US 7,172,376 B1
(45) Date of Patent: Feb. 6, 2007

(54) WORKPIECE POSITIONER

(75) Inventors: Anirudha D. Jagtap, Richmond, KY (US); Christopher T. Gullo, Lexington, KY (US); Richard J. Nicolai, Richmond, KY (US); Eric S. Anglin, Sand Gap, KY (US)

(73) Assignee: Progressive Systems, Inc., Berea, KY (US)

( * ) Notice: Subject to any disclaimer, the term of this patent is extended or adjusted under 35 U.S.C. 154(b) by 0 days.

(21) Appl. No.: 11/338,577

(22) Filed: Jan. 24, 2006

(51) Int. Cl.
*B23K 26/12* (2006.01)

(52) U.S. Cl. ............... 409/225; 219/158; 219/121.82; 219/121.86; 74/608; 409/219

(58) Field of Classification Search ............ 409/219, 409/225, 165, 168, 221, 224, 903; 29/38 A, 29/38 B; 414/736, 735, 680, 225.01; 269/60, 269/61, 71, 88, 296, 43, 114, 113, 73, 225, 269/56, 57, 58; 74/608; 219/158, 121.82, 219/121.86, 121.85, 121.6, 121.63; 82/129
See application file for complete search history.

(56) References Cited

U.S. PATENT DOCUMENTS

| | | | |
|---|---|---|---|
| 4,666,363 A * | 5/1987 | Johansson | 414/736 |
| 5,658,476 A * | 8/1997 | Gullo et al. | 219/121.86 |
| 5,873,569 A | 2/1999 | Boyd et al. | |
| 5,887,860 A * | 3/1999 | Hong | 269/225 |
| 6,264,418 B1 * | 7/2001 | Michael et al. | 414/733 |
| 6,281,474 B1 | 8/2001 | Michael et al. | |
| 6,347,733 B1 * | 2/2002 | Hickey, II | 219/121.82 |
| 6,450,490 B1 * | 9/2002 | Mangelsen et al. | 269/43 |
| 6,682,061 B2 * | 1/2004 | Steenwyk et al. | 269/61 |

* cited by examiner

*Primary Examiner*—Dana Ross
(74) *Attorney, Agent, or Firm*—Stites & Harbison, PLLC; David W. Nagle, Jr.

(57) ABSTRACT

A workpiece positioner includes a workpiece holder that is mounted to a chassis for rotation about a central axis, and further includes a first set of workpiece supports for retaining and supporting a first workpiece between a drive end and an idler end, and a second set of workpiece supports for retaining and supporting a second workpiece between the drive end and the idler end. The workpiece positioner also includes a support member that links the drive end to the idler end. This support member has a cross-sectional shape that is best characterized as an I-beam, and as such, the work envelopes for the first and second working pieces are very close together, but at the same time, still separated such that welding or other similar manufacturing and/or processing operations can be performed on each workpiece without any interference or effect on the other workpiece.

6 Claims, 6 Drawing Sheets

WORKPIECE POSITIONER

BACKGROUND OF THE INVENTION

The present invention relates to a workpiece positioner, an apparatus for moving and manipulating one or more workpieces to a predetermined position and orientation with respect to an industrial robot in automated manufacturing and/or processing operations.

In the prior art, a variety of workpiece positioners have been developed to work with industrial robots. For example, one common workpiece positioner is known as a "Ferris-wheel positioner." Such a positioner has a generally H-shaped frame structure with at least two sets of workpiece supports for supporting a pair of workpieces between the "legs" of the H-shaped frame structure. Thus, each workpiece can be independently rotated about a horizontal axis, while the H-shaped frame structure itself can also be rotated about a horizontal axis (i.e., an "exchange axis").

Another common positioner is a "three-axis table," which also has a generally H-shaped frame structure that can again itself be rotated about a horizontal axis. Furthermore, the H-shaped frame structure is mounted on a table, allowing for rotation of the entire H-shaped frame structure about a vertical axis.

As recognized and discussed in U.S. Pat. No. 5,873,569 issued to Boyd et al., such prior art positioners encounter problems when workpiece sizes approach the maximum work envelope of the associated industrial robot. For example, with respect to a Ferris-wheel positioner, since floor clearance determines the maximum size of the workpiece that can be rotated about a horizontal axis, as the workpiece size increases, more floor clearance is required. To account for the required floor clearance, the frame structure must be raised, and the robot operation height may become inconveniently high.

For another example, with respect to a three-axis table, adequate clearance between the positioner and robot is required to allow the positioner to rotate about its vertical axis. As the workpiece size increases, additional clearance and distance is required to allow for the rotation about the vertical axis. To account for the required clearance, the proximity of the robot to the workpiece is compromised, thus requiring the robot to be moved during the rotation of the positioner or foregoing optimum reach.

To address such problems associated with work space and clearance, U.S. Pat. No. 5,873,569 issued to Boyd et al. teaches a construction in which the rotary workpiece holder includes a first end and a second end, with upper and lower cross members (e.g., tie bars) fixed to and extending between the first and second ends of the workpiece holder. These cross members impart the rotation of the first end (i.e., drive end) to the second end (i.e., idler end) of the workpiece holder. More importantly, these cross members are located substantially outside of a planar area defined by the workpiece supports mounted on the first and second ends of the workpiece holder, thus allowing the workpiece-to-workpiece rotational clearance to be near zero. However, because of the positioning of these cross members a substantial distance away from the axis of rotation of the workpiece holder, and considering the significant mass of the cross members that is required to transmit torque from the drive end to the idler end of the workpiece holder, the result is a significant moment of inertia. Accordingly, the drive forces required to start or stop the rotational motion of workpiece holder are substantially increased.

Another solution is proposed in U.S. Pat. No. 6,281,474 issued to Michael et al. In the '474 patent, the workpiece positioner is also designed to allow for more efficient use of space by optimizing the size of the work envelope through which a workpiece may be rotated. Specifically, the workpiece positioner includes a rotary framework with opposite rotary framework ends, a first set of workpiece supports, and a second set of workpiece supports. The first set of workpiece supports is positioned on opposite ones of the rotary framework ends so as to define a first workpiece axis, and the second set of workpiece supports is also positioned on opposite ones of the rotary framework ends so as to define a second workpiece axis. The rotary framework further includes a crossing structure secured to the opposite rotary framework ends and extending along the longitudinal framework axis. In order to achieve the objective of optimizing the size of the work envelope through which a workpiece may be rotated, the transverse cross section of the supportive sheet material has a generally "X" shape, converging in the direction of the common workpiece plane so as to optimize the diametrical dimension of the respective rotary envelopes of workpieces supported by the first and second sets of workpiece supports. However, this is a somewhat complex structure that is not easy to manufacture or assemble.

SUMMARY OF THE INVENTION

The present invention is a workpiece positioner, an apparatus for moving and manipulating multiple workpieces to a predetermined position and orientation with respect to an industrial robot in automated manufacturing and/or processing operations.

An exemplary workpiece positioner made in accordance with the present invention generally includes a workpiece holder that is mounted to a chassis for rotation about a central axis. The workpiece positioner further includes a first set of workpiece supports for retaining and supporting a first workpiece between a drive end and an idler end, and a second set of workpiece supports for retaining and supporting a second workpiece between the drive end and the idler end. The workpiece positioner also includes a support member that links the drive end to the idler end, and further separates the work envelope for the first workpiece from the work envelope for the second workpiece.

The support member has a cross-sectional shape that is best characterized as an I-beam, with upper and lower flange portions connected by a web portion. As a result of the I-beam construction of the support member, the work envelopes for the first and second working pieces are very close together, but at the same time, still separated such that welding or other similar manufacturing and/or processing operations can be performed on each workpiece without any interference or effect on the other workpiece. This allows for a reduction in the overall "footprint" of the workpiece positioner and associated industrial robots. However, in contrast to certain prior art positioners, the workpiece positioner of the present invention is relatively simple to construct and manufacture. Furthermore, as compared to prior art constructions, the moment of inertia is decreased, lessening the drive forces required to start or stop the rotational motion of workpiece holder and/or allowing for greater rotational speeds.

DETAILED DESCRIPTION OF THE INVENTION

The present invention is a workpiece positioner, an apparatus for moving and manipulating multiple workpieces to a predetermined position and orientation with respect to an industrial robot in automated manufacturing and/or processing operations.

Figure 1:
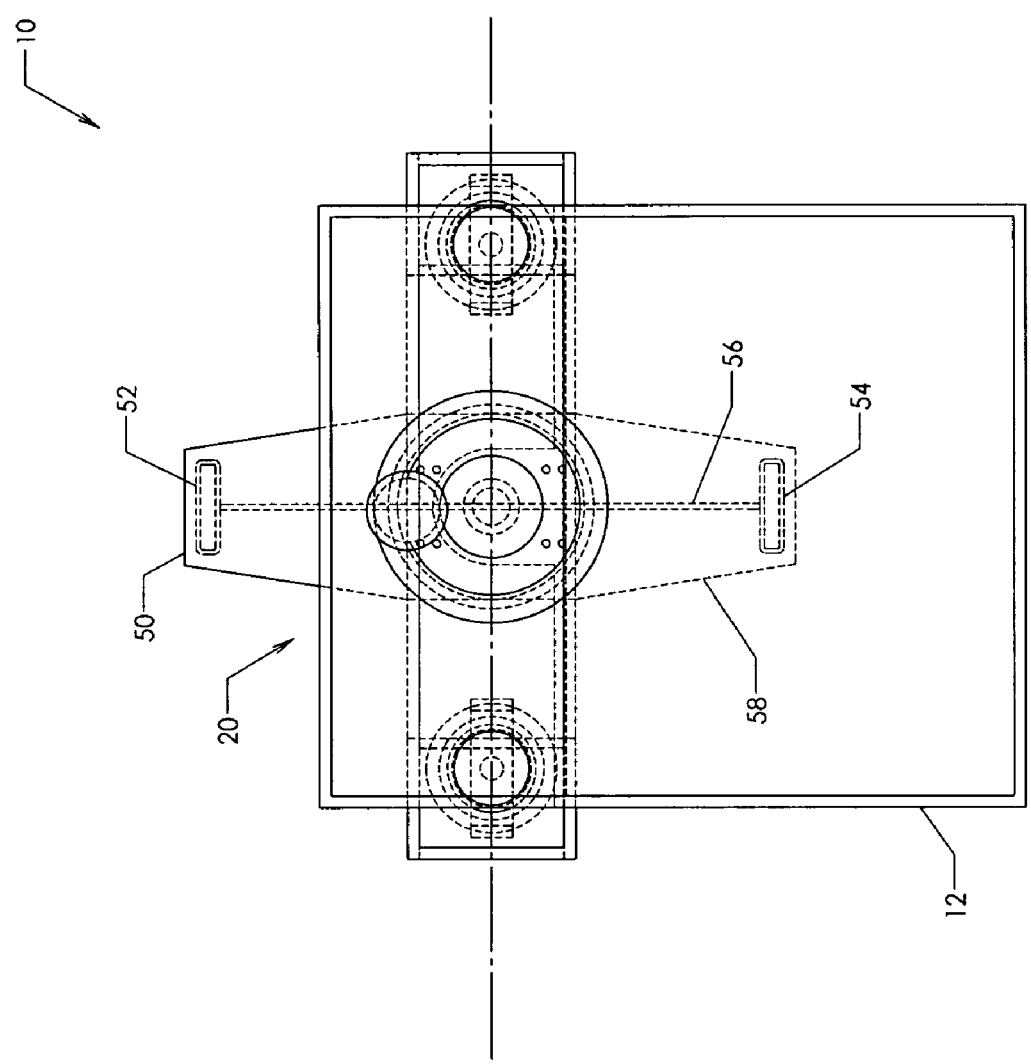
FIG. 1 is an end view of an exemplary workpiece positioner made in accordance with the present invention.
Figure 2:
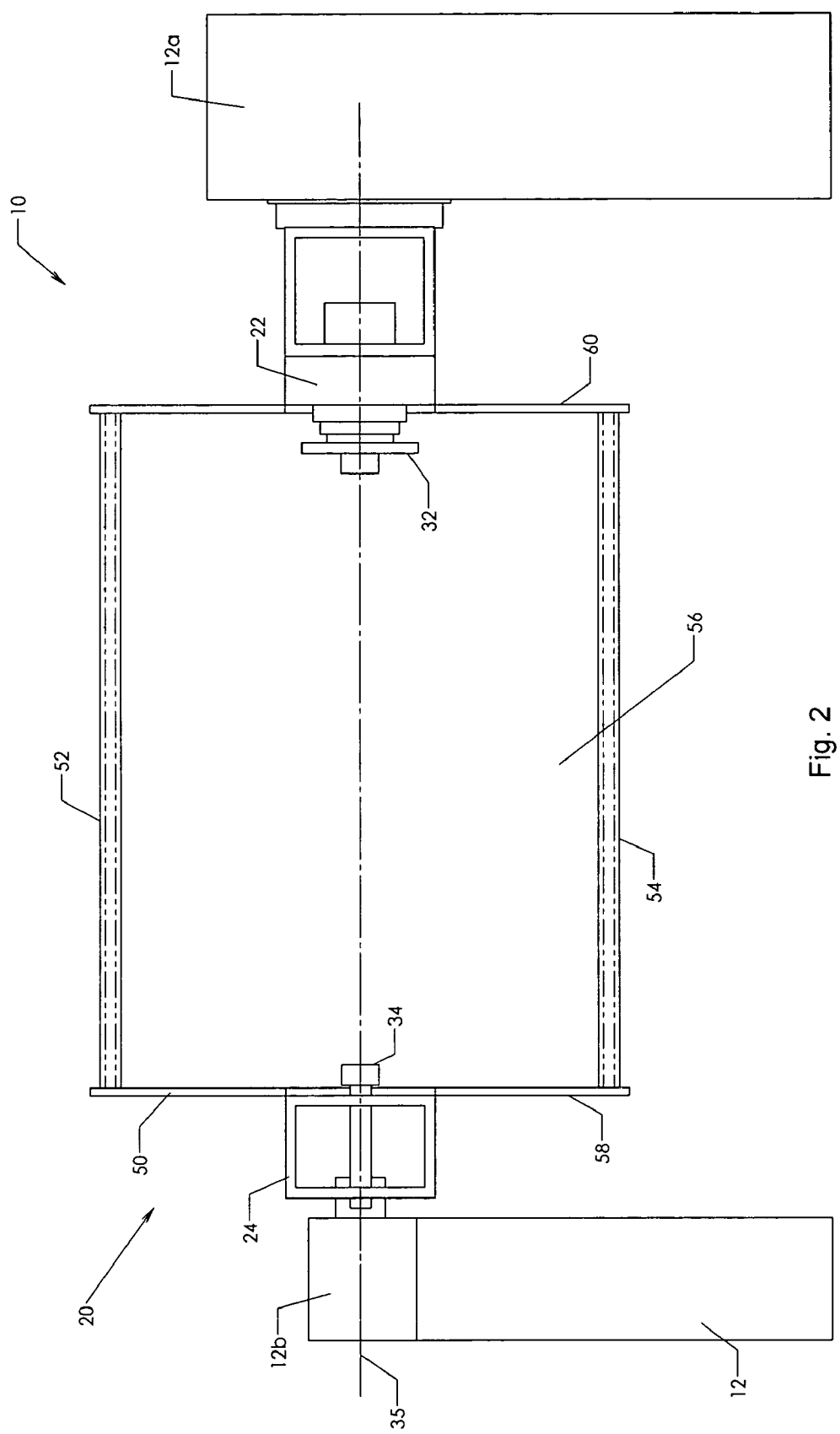
FIG. 2 is a side view of the workpiece positioner of FIG. 1.
Figure 3:
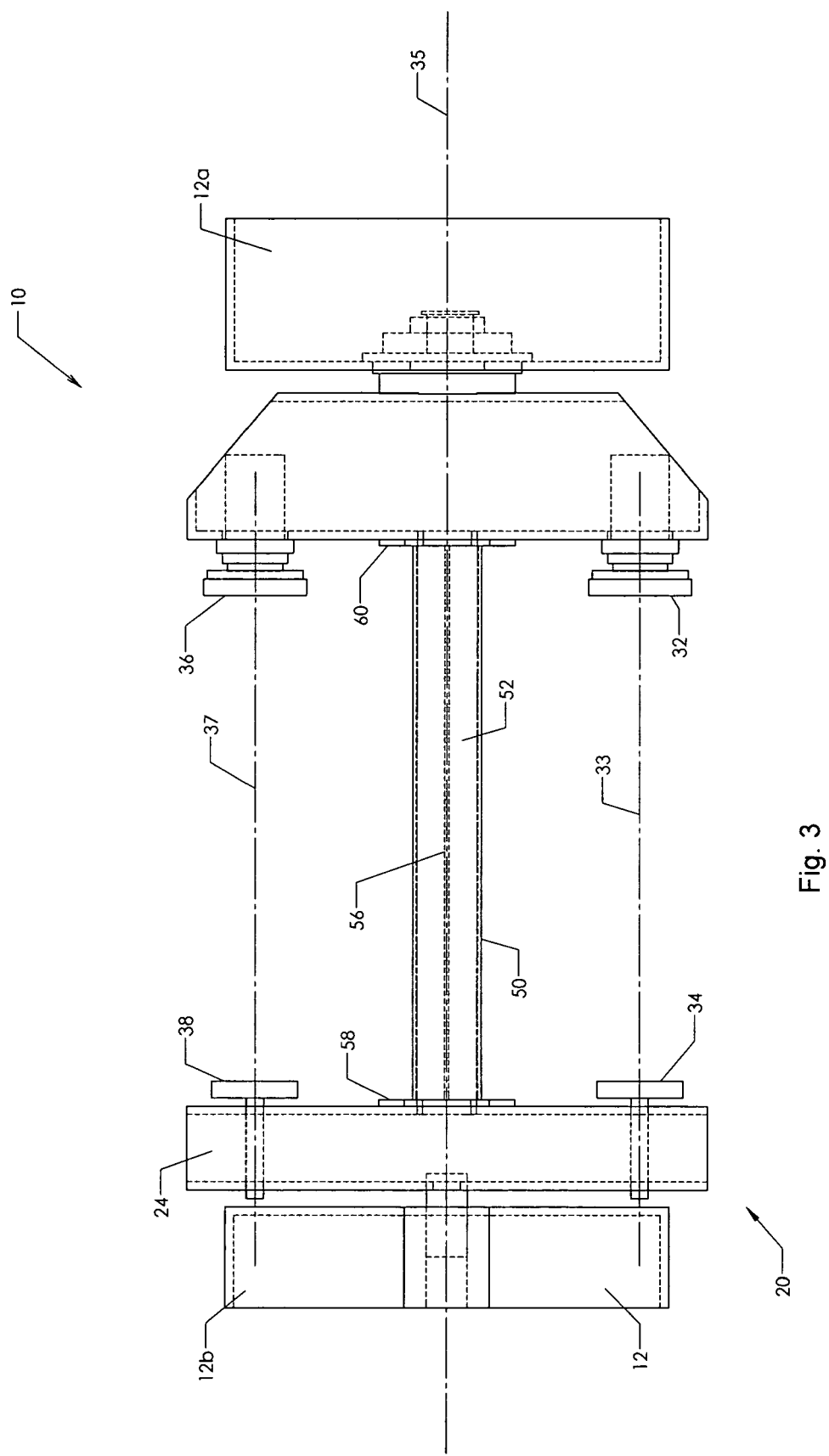
FIG. 3 is a top view of the workpiece positioner of FIG. 1.

FIGS. 1–3 are various views of an exemplary workpiece positioner 10 made in accordance with the present invention. The workpiece positioner 10 generally includes a workpiece holder 20 that is mounted to a chassis 12 for rotation about a central axis 35. The workpiece positioner 10 further includes a first set of workpiece supports 32, 34 for retaining and supporting a first workpiece (not shown), and a second set of workpiece supports 36, 38 for retaining and supporting a second workpiece (not shown). The supports 32, 36 are at the headstock or drive end 22 of the workpiece holder 20, while the supports 34, 38 are at the tailstock or idler end 24 of the workpiece holder 20. The workpiece positioner 10 also includes a support member 50 that links the drive end 22 to the idler end 24. This support member 50 has a cross-sectional shape that is best characterized as an I-beam, with upper and lower flange portions 52, 54 connected by a web portion 56, as further described below.

Referring still to FIGS. 1–3, the first set of workpiece supports 32, 34 is positioned on one side of the support member 50 and defines a first workpiece axis 33. The second set of workpiece supports 36, 38 is positioned on the opposite side of the support member 50 and defines a second workpiece axis 37. The first workpiece axis 33 and the second workpiece axis 37 generally lie in a common workpiece plane. Accordingly, the work envelope for the first workpiece is effectively separated from the work envelope for the second workpiece.

As mentioned above, the workpiece holder 20 is mounted to the chassis 12 for rotation about a central axis 35. A holder drive means is housed within a first portion 12a of the chassis 12, and includes the motor, gears, and/or other mechanical components necessary to rotate the workpiece holder 20 about the central axis 35. Such a drive means is well known in the art. There is also a workpiece drive means (i.e., motors, gears, and/or other mechanical components) at the drive end 22 of the workpiece holder 20 for selectively and independently rotating a first workpiece about the first workpiece axis 33 and a second workpiece about the second workpiece axis 37. Specifically, the workpiece supports 32, 36 at the drive end 22 are rotated by such a drive means, while the workpiece supports 34, 38 at the idler end 24 accommodate such rotation. Again, such a drive means is well known in the art.

Figure 4:
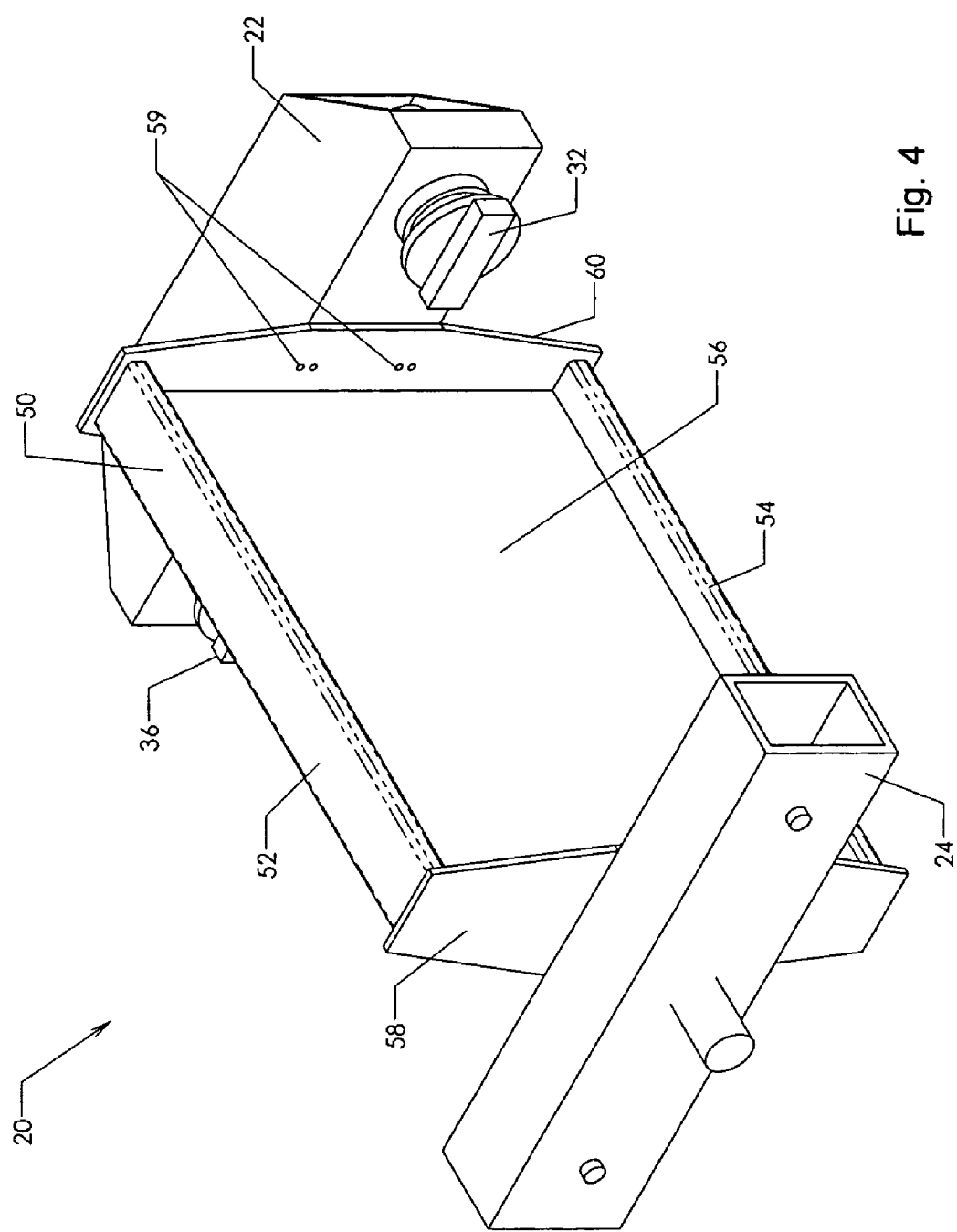
FIG. 4 is a perspective view of the workpiece holder of the workpiece positioner of FIG. 1.

The focus of the present invention thus turns to the support member 50, which is perhaps best illustrated in the perspective view of the workpiece holder 20 in FIG. 4. This support member 50 has a cross-sectional shape that is best characterized as an I-beam, with upper and lower flange portions 52, 54 connected by a web portion 56. In this exemplary embodiment, the flange portions 52, 54 are welded or similarly secured to the respective upper and lower edges of the web portion 56. However, it is contemplated that the support member 50 could have a unitary construction, in which the flange portions 52, 54 and web portion 56 are not discrete components, but rather portions of a unitary body, without departing from the spirit and scope of the present invention. In any event, end plates 58, 60 are secured to either end of the I-beam, completing the assembly of the support member 50. These end plates 58, 60 also facilitate the attachment of the support member 50 to the respective drive end 22 and idler end 24 of the workpiece holder 20. Specifically, openings 59 defined through each plate 58, 60 can be placed in registry with corresponding openings (not shown) of the respective drive end 22 and idler end 24 of the workpiece holder 20, allowing bolts or similar fasteners to be used to secure the support member 50 to the workpiece holder 20. As such, the support member 50 serves as a rotational coupling between the drive end 22 and the idler end 24 of the workpiece holder 20.

Perhaps more importantly, as a result of such an I-beam construction, the work envelopes for the first and second working pieces are very close together, but at the same time, still separated such that welding or other similar manufacturing and/or processing operations can be performed on each workpiece without any interference or effect on the other workpiece. This close proximity of the work envelopes allows for a reduction in the overall "footprint" of the workpiece positioner and associated industrial robots. However, in contrast to certain prior art positioners, the workpiece positioner 10 of the present invention, and especially the support member 50, is relatively simple to construct and manufacture.

Figure 5:
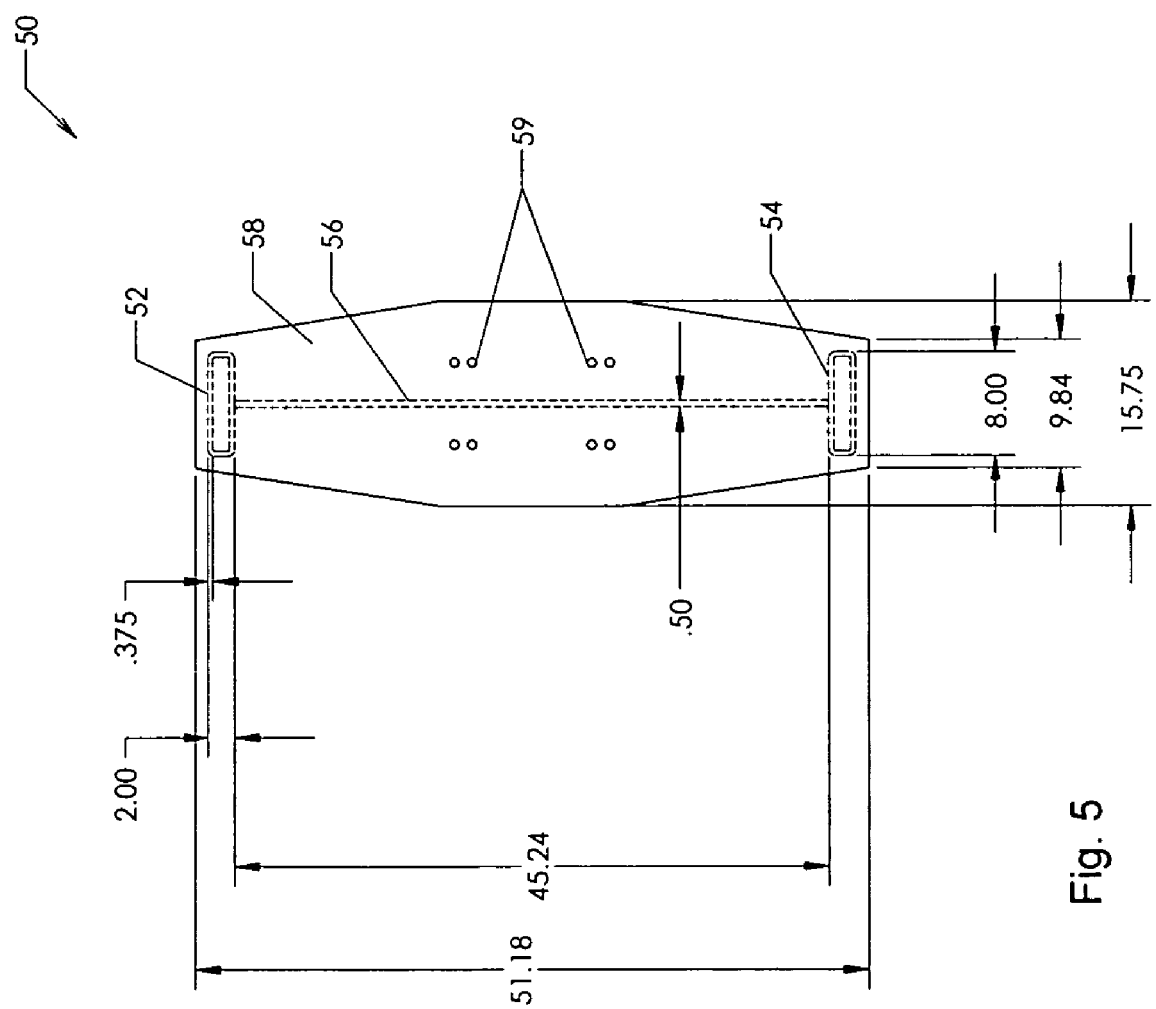
FIG. 5 is an end view of the support member of the workpiece positioner of FIG. 1, including exemplary dimensions.
Figure 6:
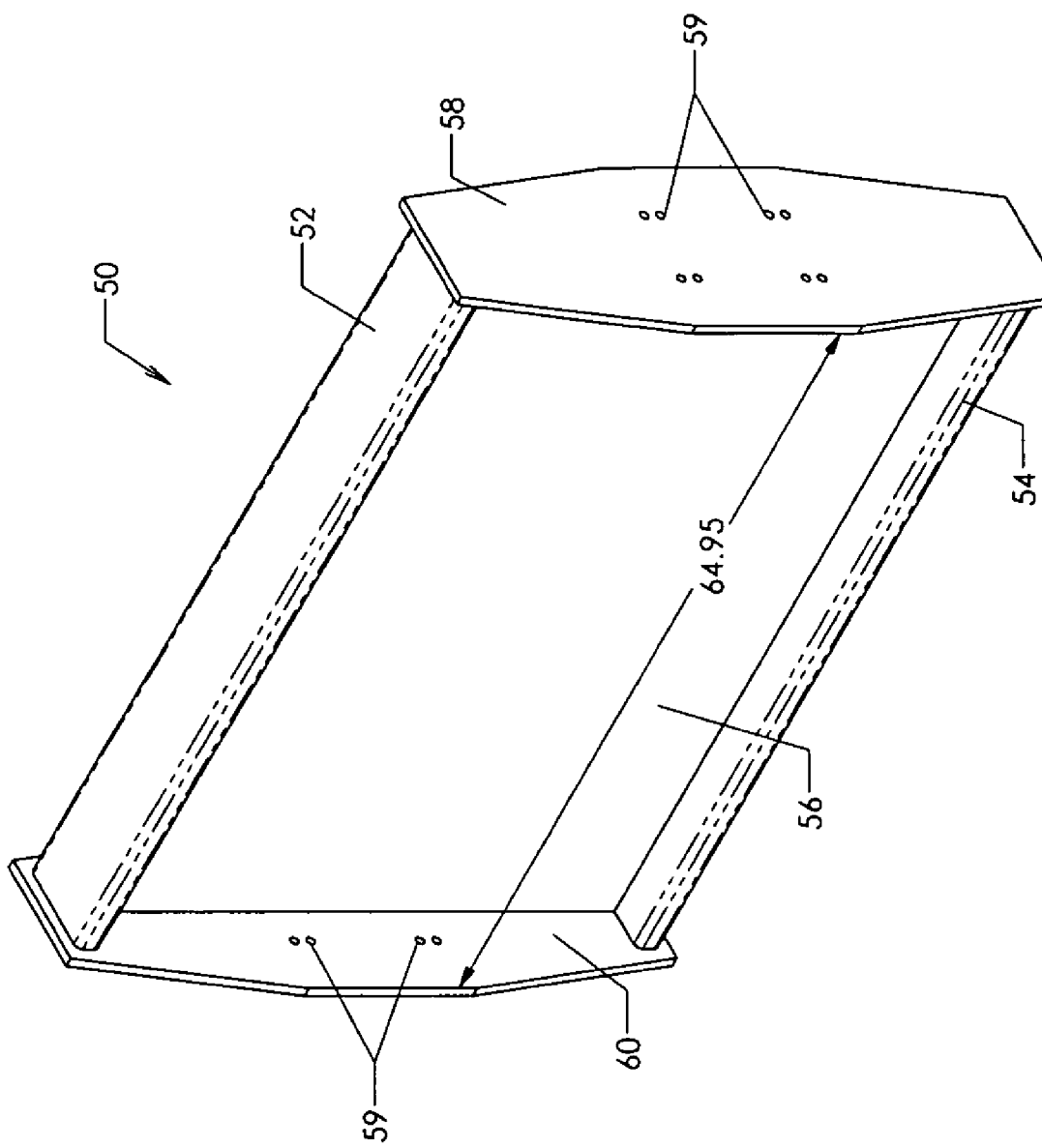
FIG. 6 is a perspective view of the support member of the workpiece positioner of FIG. 1, including exemplary dimensions.

FIGS. 5 and 6 are respective end and perspective views of an support member 50 alone, and further include exemplary dimensions of the support member 50. Specifically, and as illustrated in FIGS. 5 and 6, in this exemplary embodiment, the web portion 56 of the support member 50 is a steel plate with a 0.50" thickness. The web portion 56 is approximately 45.24" height and 64.95" wide. Each of the flange portions 52, 54 is welded or similarly secured to the respective upper and lower edges of the web portion 56. Each of the flange portions 52, 54 is constructed of 0.375" rectangular steel tube that is approximately 2.00" high and 8.00" wide. Finally, and as mentioned above, substantially identical end plates 58, 60 are secured to either end of the I-beam, completing the assembly of the support member 50. These end plates 58, 60 are also steel plates with a 0.75" thickness. These plates 58, 60 are approximately 51.18" high and each have a generally octagonal shape, with a minimum width of approximately 9.84" and a maximum width of 15.75". Of course, these dimensions are only for purposes of example and provide some understanding of the relative size of the portions of the support member 50 in one exemplary embodiment. Of course, various other dimensions and/or proportions are contemplated and within the scope of the present invention, provided that the support member 50 continues to have a cross-sectional shape that can be generally characterized as an I-beam.

Again, as a result of such an I-beam construction, the work envelopes for the first and second working pieces are very close together, but at the same time, still separated such that welding or other similar manufacturing and/or processing operations can be performed on each workpiece without any interference or effect on the other workpiece. Furthermore, since a primary function of the support member 50 is that it serves as a rotational coupling between the drive end 22 and the idler end 24 of the workpiece holder 20, it must transmit a fairly significant torque from the drive end 22 to the idler end 24. Through the use of an I-beam construction, however, such torque is transmitted not only through the flange portions 52, 54 of the support member 50, but also through the web portion 56. Accordingly, as compared to many prior art constructions, the moment of inertia is decreased, lessening the drive forces required to start or stop the rotational motion of workpiece holder 20, allowing for greater rotational speeds, and/or more precise control. For example, the flange portions 52, 54 of the support member 50 in the present invention can have a substantially decreased mass as compared to the cross members described in U.S. Pat. No. 5,873,569, while supporting similar sized workpieces. Nevertheless, the objective of positioning the work envelopes for the first and second working pieces very close together is still achieved.

One of ordinary skill in the art will recognize that additional embodiments are possible without departing from the teachings of the present invention. This detailed description, and particularly the specific details of the exemplary embodiments disclosed therein, is given primarily for clarity of understanding, and no unnecessary limitations are to be understood therefrom, for modifications will become obvious to those skilled in the art upon reading this disclosure and may be made without departing from the spirit or scope of the invention.

What is claimed is:

1. A workpiece positioner, comprising:
   a chassis;
   a workpiece holder mounted to said chassis for rotation about a central axis, said workpiece holder having a drive end and an idler end;
   a first set of workpiece supports mounted on said workpiece holder and adapted to retain and support a first workpiece;
   a second set of workpiece supports mounted on said workpiece holder and adapted to retain and support a second workpiece;
   a holder drive means for rotating said workpiece holder about the central axis;
   a workpiece drive means for selectively and independently rotating said first workpiece about a first workpiece axis and said second workpiece about a second workpiece axis; and
   a support member attached to and extending between the drive end and the idler end of the workpiece holder, said support member serving as a rotational coupling between the drive end and the idler end of the workpiece holder, said support member serving as a barrier between the first and second workpieces, and said support member having a cross-sectional shape that is characterized as an I-beam, with upper and lower flange portions connected solely by a single web portion, such that the web portion is the only barrier between the first and second workpieces.

2. The workpiece positioner as recited in claim 1, wherein said support member further includes end plates, each such end plate secured to a respective end of said web portion and said upper and lower flange portions.

3. The workpiece positioner as recited in claim 1, wherein the flange portions of said support member are welded or similarly secured to respective upper and lower edges of said web portion.

4. The workpiece positioner as recited in claim 3, wherein the flange portions of said support member are constructed of rectangular steel tube.

5. The workpiece positioner as recited in claim 1, wherein said support member has a unitary construction with the flange portions and said web portions are part of a unitary body.

6. In a workpiece positioner having a workpiece holder mounted for rotation with respect to a chassis, and including at least two sets of workpiece supports, each set of workpiece supports adapted to retain a workpiece therebetween, the improvement comprising:
   a support member attached to said workpiece holder and extending between the two sets of workpiece supports, said support member serving as a barrier between first and second workpieces, and said support member having a cross-sectional shape that is characterized as an I-beam, with upper and lower flange portions connected by a single web portion, such that the web portion is the only barrier between the first and second workpieces.

* * * * *